W. TELLINGHUISEN & R. SMIDT.
TRACTOR STEERING ATTACHMENT.
APPLICATION FILED DEC. 11, 1917.
1,282,982.
Patented Oct. 29, 1918.
2 SHEETS—SHEET 1.
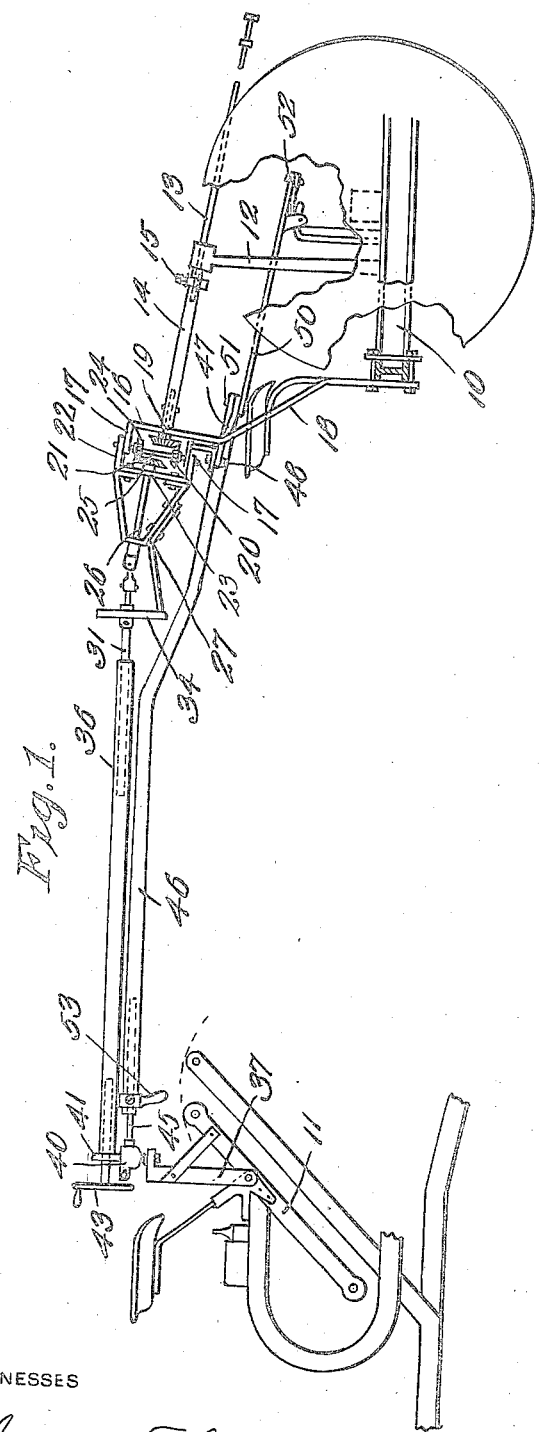
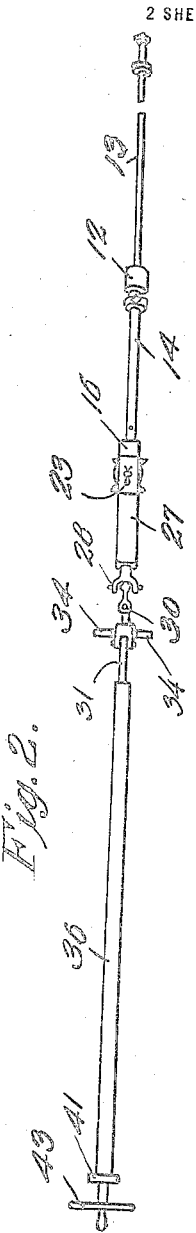
INVENTOR
Weert Tellinghuisen,
and Rieke Smidt
WITNESSES
James F. Crown,
Wm Jeaman
By Richard Oliver,
ATTORNEY

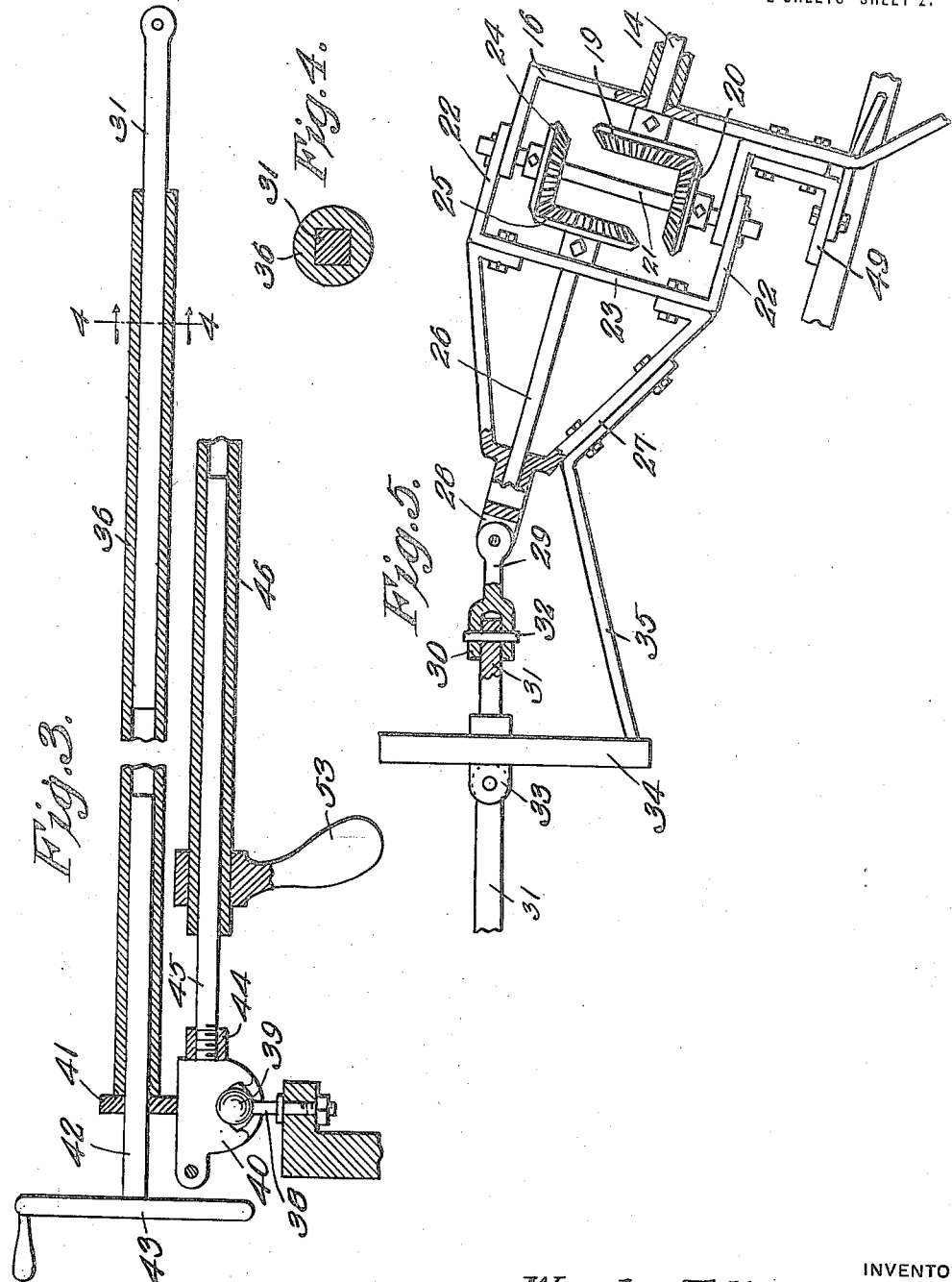

UNITED STATES PATENT OFFICE.

WEERT TELLINGHUISEN AND RIEKE SMIDT, OF WHITE, SOUTH DAKOTA.

TRACTOR STEERING ATTACHMENT.

1,282,982. Specification of Letters Patent. Patented Oct. 29, 1918.

Application filed December 11, 1917. Serial No. 206,648.

*To all whom it may concern:*

Be it known that we, WEERT TELLINGHUISEN and RIEKE SMIDT, citizens of the United States, residing at White, in the county of Brookings and State of South Dakota, have invented certain new and useful Improvements in Tractor Steering Attachments, of which the following is a specification.

This invention has relation to steering devices, and has for an object to provide a steering device for a traction engine whereby the tractor may be steered by the operator seated upon a trailer, an agricultural machine or other machine, which is hitched to the tractor.

Another object of the invention is to provide a steering device for traction machines designed particularly for use in connection with harvesting machines, such as a binder which is hitched to the tractor and whereby the tractor may be steered by the operator seated upon the binder frame thereby permitting the levers of the binder to be readily manipulated and both the tractor and binder controlled by a single operator.

A still further object of the invention is to provide a steering device for tractors having the above named characteristics and means associated with the steering device for manipulating the clutch or other controlling lever of the tractor from the seat of the binder or other machine drawn by the tractor.

A still further object of the invention is to provide a steering and controlling device for tractors having the characteristics above described including controlling rods mounted for rotation and sliding movement and jointed so that the traction engine may be steered and turned around a corner and the controlling and steering device manipulated in any position of the tractor relative to the binder.

In addition to the foregoing our invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:—

Figure 1, is a view in side elevation of our controlling device illustrating its application to a traction engine, and binder.

Fig. 2, is a view of the device itself in plan.

Fig. 3, is a detail view in section of the rear portion of the device.

Fig. 4, is a detail view in section taken on the line 4—4 of Fig. 3, and

Fig. 5, is a detail view in elevation, partly in section illustrating the connection between the sections of the steering rod.

With reference to the drawings 10 indicates a portion of the frame of a traction engine and 11 a portion of the frame of a binder which are hitched together by means of a draw bar (not shown) or any other suitable means. The tractor frame is usually provided with a standard 12 forming a guide for a steering rod 13 which is inclined upwardly with its upper end journaled in the upper end of said standard and its opposite or lower end connected to the steering wheel or reduction gear for rotating the same. The upper end of the steering rod 13 is usually provided with a hand wheel which is removed when my attachment is applied.

Our attachment includes a tubular rod 14 which is connected to the steering rod 13 by receiving the end of the steering rod in said tubular member, the rod and tubular member being secured together by means of a set screw 15 or the like. The opposite end of the tubular member 14 is journaled in a yoke 16 forming a part of our invention and having parallel spaced members 17. The yoke 16 is mounted upon a bar or the like 18 extended vertically and secured at its lower end to the frame of the tractor. The terminal of the tubular member 14 located within the yoke 16 is provided with a beveled gear and indicated at 19 for meshing engagement with the bevel gear 20 mounted on a shaft 21 which extends at right angles to the tubular member 14 and is journaled in the members 17 of the yoke, said shaft 21 extending at its ends beyond the members 17 for engagement in the terminals 22 of a second yoke 23. Said yoke 23 is thus pivotally connected to the yoke 16 for movement relative thereto.

The shaft 21 carries a second bevel gear 24 which is in meshing engagement with a bevel gear 25 mounted upon a rod 26 journaled at one end in the yoke 23 and at its other end in an extension 27 secured to said yoke.

The terminal of the rod 26 opposite that end carrying the gear 25 is bifurcated as at 28 and apertured to receive the apertured end of a link 29 pivotally connected thereto, the other end of said link 29 being bifurcated as at 30 and apertured to receive the apertured terminal of a rod 31 the parts being pivotally connected by means of a pin 32 inserted in the apertures of said bifurcated portion and said rod. The rod 31 is formed with a block 33 interposed in its length which is guided within a pair of vertical guides 34 mounted upon an extension 35 of the frame 27 whereby to guide said rod 31 for vertical movement. The rod 31 is inserted in a tubular member 36 said rod being square in cross section to enter the complementarily formed opening in the tubular member 36 whereby to insure rotation of said rod 31 and member 36 in unison but to permit longitudinal sliding movement relative to each other.

Mounted upon the binder frame 11 is a standard 37 which carries a bolt 38 upon its upper end, said bolt being formed with a spherical member 39 which enters a casing 40 designed to receive the spherical member and to form in effect a universal joint. The casing 40 is provided with a bearing 41 to receive a rod 42 one end of the rod being squared and extended into the above mentioned tubular member 36 while the opposite end is provided with a hand wheel 43.

An internally threaded sleeve 44 is formed on the universal joint casing 40 to receive one end of a threaded rod 45 located beneath the tubular member 36 and extended in parallelism thereto with the opposite end of said rod entering a tubular member 46 which extends forwardly and is offset downwardly to avoid the joints between the rods 14 and 36 described above, and is pivotally connected to one end of an arm 47 which is pivotally connected as at 48 at its other end to a bracket 49 which is secured to the yoke 16. A link 50 is pivotally connected upon the bolt 51 which connects the end of the rod 46 to the mentioned arm 47, while the opposite end of said link is connected to a lever 52 which is designed to actuate the clutch or other controlling device for the prime mover of the tractor.

In operation the tractor is steered by rotating the hand wheel 43 whose motion is communicated to the rods 42, 36, 31 and 26, to the gear wheel 25 at the rear end thereof, the motion of said gear wheel being transmitted through the gears 24 and 20 to the gear 19 which in turn rotates the rod 14 having direct connection to the steering rod 13. The tractor may thereby be steered from the binder. It will be apparent that the provision of the yokes 16 and 23 permits the tractor to turn or execute a curved path relatively to the binder without interfering with the transmission of motion to the steering mechanism, inasmuch as the gears 19, 20, 24 and 25 are constantly in mesh regardless of the relative position of the yokes 16 and 23. To actuate the clutch or other controlling device of the tractor the rod 46 is moved longitudinally by means of a handle 53 secured thereto at its forward end, and the longitudinal motion of said rod 46 communicated through the arm 47 and link 50 to the clutch lever 52. It will be apparent that owing to the pivotal connection 51 this motion of the rod 46 may be transmitted to the clutch lever regardless of the position of the tractor relative to the binder. The guide members 34 furthermore assist in partly retaining the parts in alinement and at the same time permit vertical movement of the tractor relative to the binder or vice versa when traveling over rough ground without interfering with the operation of the steering device.

While we have illustrated and described our invention with some degree of particularity, we realize that in practice various alterations thereover may be made, and we therefore desire to reserve the right and privilege of changing the form of the details of construction or otherwise altering the arrangement of the correlative parts without departing from the spirit of the invention or the scope of the appended claims.

Having thus described our invention what we claim as new and desire to secure by Letters Patent is—

1. In combination with a tractor, a binder including the steering rod, a pair of yokes for relative movement, one yoke being mounted on the tractor frame, and the other free for movement relative to the frame, a rod journaled in the stationary yoke for connection to the steering rod, a second steering rod journaled in the movable yoke, gearing connecting the adjacent ends of the steering rods within the yokes to permit transmission of motion from one rod to the other regardless of the relative positions of the yokes, a universal connection between the second rod and the binder frame, and a guide mounted on the movable yoke for guiding the second rod for vertical movement.

2. In combination with a traction engine and binder including the steering rod, a yoke fixedly mounted on the traction engine frame, a second yoke pivotally connected to the first for movement in a horizontal plane, a steering rod journaled in the first yoke, a connection between said steering rod and the traction engine steering rod, a second steering rod journaled in the movable yoke, means for transmitting motion between said steering rod and the steering rod of the first yokes, a telescoping rod, means connecting one end of said telescoping rod to the binder frame for universal movement, means connecting the other end of the telescoping rod to the second steering rod for movement in a vertical plane, and a guide mounted on the movable yoke for guiding the telescoping rod for vertical movement.

3. In combination with a traction engine and binder including the steering rod of the traction engine, and the controlling lever, a yoke stationarily mounted on the traction-engine frame, a rod journaled in said yoke for connection to the steering rod, a second yoke pivotally connected to the first for relative-movement in a horizontal plane, a second rod journaled in said yoke, a gearing connection between the adjacent ends of said rods to transmit motion therebetween, a telescopic rod, a pivotal connection between one end of said telescopic rod and the second rod for relative movement in a vertical plane, a guide member mounted on the movable yoke for guiding the telescopic rod for vertical movement, means for rotating the telescopic rod, a lever fulcrumed on the stationary yoke, a linkage connection and a controlling lever of the traction engine, a telescopic rod pivotally connected to said lever, a universal connection between the opposite end of said second telescopic rod, the first telescopic rod and the binder frame, and means for sliding the second telescopic rod.

4. A steering and controlling mechanism for a traction engine, including a pair of yokes pivotally connected for relative movement, means for mounting one yoke on the frame of the traction engine, a pair of steering rods one journaled in each yoke, gearing connecting the adjacent ends of the steering rods to permit transmission of motion from one rod to the other regardless of the relative position of the yokes, a steering wheel, a telescopic connection between one of the steering rods and said steering wheel, a second telescopic rod, means connecting one end of said second mentioned telescoping rod with the adjacent end of the first, and a linkage connection at the other end of the second mentioned telescopic rod for actuating the clutch of the traction engine.

5. In combination with a traction engine and binder hitched thereto, a standard on the binder frame, a pair of parallel telescopic rods, a universal connection between said rods and the standard, means for sliding one rod, means for rotating the other rod, a linkage connection between the sliding rod and the clutch lever of the traction engine, a pair of relatively movable yokes, means mounting one yoke on the traction frame, the rotatable telescopic rod being journaled in the other yoke, a second rotatable rod journaled in the first mentioned yoke for connection to the steering mechanism of the traction engine, and a gearing between the rotatable rod within the yoke to permit transmission of motion from one to the other regardless of the relative position of the yokes.

In testimony whereof we affix our signatures in presence of two witnesses.

WEERT TELLINGHUISEN.
RIEKE SMIDT.

Witnesses:
  G. F. GRIEPENTROG,
  E. E. THAYER.